United States Patent [19]

Koerner et al.

[11] Patent Number: 4,749,764

[45] Date of Patent: Jun. 7, 1988

[54] PROCESS FOR THE PREPARATION OF HEAT-CURABLE SILICONE

[75] Inventors: Götz Koerner; Vaclav Kropac, both of Essen, Fed. Rep. of Germany

[73] Assignee: Th. Goldschmidt AG, Essen, Fed. Rep. of Germany

[21] Appl. No.: 51,244

[22] Filed: May 13, 1987

Related U.S. Application Data

[63] Continuation of Ser. No. 608,912, May 10, 1984, abandoned, which is a continuation of Ser. No. 442,571, Nov. 18, 1982, abandoned, which is a continuation of Ser. No. 52,310, Jun. 26, 1979, abandoned.

[30] Foreign Application Priority Data

Jul. 1, 1978 [DE] Fed. Rep. of Germany ....... 2828990

[51] Int. Cl.$^4$ ............................................. C08G 77/06
[52] U.S. Cl. ........................................ 528/15; 528/17; 528/23; 528/29; 528/43; 525/474
[58] Field of Search ................. 525/474; 528/29, 43, 528/15, 17, 23

[56] References Cited

U.S. PATENT DOCUMENTS

| | | | |
|---|---|---|---|
| 2,842,521 | 7/1958 | Nitzsche et al. | 525/474 |
| 2,885,384 | 5/1959 | Sterman | 525/474 |
| 3,480,583 | 11/1969 | Bailey et al. | 525/474 |
| 3,668,272 | 6/1972 | Sekmakas | 525/474 |
| 3,725,339 | 4/1973 | Koerner et al. | 528/21 |
| 4,408,031 | 10/1983 | Holtschmidt et al. | 528/29 |

FOREIGN PATENT DOCUMENTS

| | | | |
|---|---|---|---|
| 528137 | 7/1956 | Canada | 528/29 |
| 1302474 | 1/1973 | United Kingdom . | |
| 1346864 | 2/1974 | United Kingdom . | |

Primary Examiner—Melvyn I. Marquis
Attorney, Agent, or Firm—Toren, McGeady & Associates

[57] ABSTRACT

A method for preparing heat-curable silicone resins by reacting siloxanes with low molecular, multifunctional alcohol and removing the alcohol from the reaction mixture such that each siloxane group corresponds to approximately one alcohol group and terminating the reaction at a degree of conversion of 25% to 80% by cooling the reaction mixture to a temperature of less than 100° C. The silicone resins prepared according to this process have excellent storage stability in the uncured state, a high rate of curing and excellent pigment compatibility and the cured resins possess high thermal stability with good elasticity and good adhesion to metallic substrates.

26 Claims, No Drawings

PROCESS FOR THE PREPARATION OF HEAT-CURABLE SILICONE

This is a continuation of application Ser. No. 608,912, filed May 10, 1984, now abandoned, is a continuation of application Ser. No. 442,571 filed Nov. 18, 1982, now abandoned, which is a continuation of application Ser. No. 052,310 filed June 26, 1979 now abandoned.

BACKGROUND OF THE INVENTION

1. Field of the Invention

The invention relates to a process for the preparation of heat-curable silicone resins by the reaction of alkoxysiloxanes with polyfunctional organic hydroxyl compounds.

2. Description of the Prior Art

Methyl and methylphenyl polysiloxane resins are known from German Patent No. 20 20 224, which have a ratio of organic groups (R) to silicon atoms of 0.95 to 1.5 and in which the remaining silicon valences are satisfied by oxygen and alkoxy groups. In these resins, the alkoxy groups may be present in amounts up to 0.75 moles of alkoxy per 100 g of resin and R represents methyl and/or phenyl residues and up to 20 mole percent of the methyl and/or phenyl residues may be replaced by vinyl residues. The resins are characterized by the fact that they are prepared by the reaction, at 10° to 90° C., of a halogen silane mixture, with an R:Si of 0.95 to 1.5, with a mixture consisting of (a) tertiary, chain-shaped aliphatic alcohols with 4 to 8 carbon atoms and
(b) primary and/or secondary, chain-shaped aliphatic alcohols with 1 to 8 carbon atoms in which 0.4 to 0.6 moles of tertiary alcohol are used per mole of halogen linked to silicon, and 0.5 to 1 mole of primary and/or secondary alcohol is used per mole of tertiary alcohol. The reaction product may optionally be subjected to a conventional post-condensation. These methyl or methylphenyl polysiloxane resins are superior to silicone resins, which are prepared by the previously customary process of hydrolyzing mixtures of mono, di and trifunctional silanes with an excess amount of water. The resins, prepared according to German Patent No. 20 20 224 produce hard and elastic lacquer films with excellent heat stability.

The preparation of these resins has a process-engineering disadvantage in that before use, the pre-products of the resins were subjected to a post-condensation with FeCl₃ and the FeCl₃ must be washed out with water after the post-condensation. This requires an additional process step which also contaminates the effluent water with acidic waste materials, solvents and iron salts. It is a further disadvantage of these polysiloxane resins that their compatibility with pigments is sometimes inadequate. In addition, the thermal stability and elasticity of the lacquer films required for certain technical applications, cannot always be attained with these polysiloxane resins.

German Patent No. 21 07 471 discloses that the resin pre-products, initially produced according to the teachings of German Pat. No. 20 20 224, may be reacted with organic resin pre-products in such a manner that the SiOR groups contained in the resin pre-product react with the COH groups of the organic resin pre-products.

Since the organic resin pre-products have COH groups, the polyesters which have been indicated as being suitable are obtained by the reaction of adipic acid, terephthalic acid, isophthalic acid, phthalic acid or their esters, e.g., methyl esters, or anhydrides on the one hand, with multifunctional alcohols, such as, for example, ethylene glycol, trimethylolpropane, glycerin and pentaerythritol, on the other. Acrylic resins, epoxide resins, polycarbonates, phenolic resins, melamine resins, or urea resins with free COH groups may also be used. Alkyd resins, wich contain esters of multi-unsaturated carboxylic acids, are of particular importance.

These silicone-modified organic resins are superior to the previously produced mixed resins of the state of the art in respect to heat stability, weatherability, elasticity, moldability, resistance to yellowing, maintenance of gloss and adhesion to the substrate. However, because of their structure, they necessarily have the disadvantages brought about by the incorporation of organic resin pre-products.

SUMMARY OF THE INVENTION

With the present invention, we can produce novel, heat-curable silicone resins which are simple to manufacture, and which process produces a storage-stable resin pre-product, which is amenable to curing, has an increased rate of setting, good resistance to hydrolysis even in the pre-cured state, and improved pigment compatibility. At the same time, the cured resin films have improved thermal stability and elasticity and therefore improved adhesion to metallic substrates. Under thermal stresses, the cured resins exhibit as low a weight loss as possible.

We have discovered that these and other advantageous properties can be attained by reacting selected reactive siloxanes with low molecular weight multifunctional alcohols in a particular manner.

Specifically, in the present process, siloxanes of the general formula

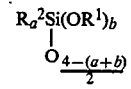

in which
OR¹ is an alkoxy group of a primary or secondary aliphatic alcohol with 1 to 4 carbon atoms,
R² is an alkyl and/or phenyl group,
a has a value of 1.0 to 1.5,
b has a value of 0.1 to 0.7,
are reacted with low molecular weight, multifunctional alcohols at temperatures of 100° to 160° C., optionally in the presence of well-known transesterification catalysts and solvents, with the removal of the alcohol R¹OH in such a ratio of quantities that one SiOR¹ group corresponds approximately to one COH group and that the reaction is terminated at a 25% to 80% degree of conversion by cooling to a temperature of less than 100° C.

DESCRIPTION OF THE PREFERRED EMBODIMENT

As OR¹ groups, the methoxy, ethoxy, n-propoxy or isopropoxy as well as n-butoxy or isobutoxy groups are suitable. The methoxy group is particularly preferred.

We have found that heat-curable silicone resins with particularly good storage stability can be prepared when the starting siloxane contains methoxy groups as well as higher alkoxy groups from the series n-propoxy or isopropoxy and n-butoxy or isobutoxy. The molar ratio of methoxy to higher alkoxy groups shall be 2.5 to 1:1. At the same time, the different reactivity of the alkoxy groups with the low molecular weight, multivalent alcohols is utilized.

$R^2$ represents alkyl and/or phenyl groups. As alkyl groups, the lower alkyl groups with 1 to 4 carbon atoms are preferred and the methyl group is especially preferred. However, higher alkyl groups, for example, alkyl groups with up to 18 carbon atoms, may also be present. As a rule, however, these are not the only $R^1$ groups used, but are present along with lower alkyl groups, and especially methyl groups.

Particularly preferred are silicone resins, in which $R^1$ represents a methyl as well as a phenyl group. At the same time, a molar ratio of methyl to phenyl groups of 0.5 to 1.5:1, and preferably of 0.75 to 1.25:1 is particularly preferred. The degree of branching of the silicone resin is determined by the siloxane by the indexes a and b. The value of a is 1.0 to 1.5, preferably 1.2 to 1.4 and that of b is 0.1 to 0.7, preferably 0.3 to 0.6.

The degree of branching is additionally determined by the structure of the low molecular weight, multifunctional alcohol.

Within the organosilicon reaction components, those compounds are preferred which have 10 to 30 mole percent of dimethylsiloxy units and 5 to 10 mole percent of trimethylsiloxy units. Especially preferred are those compounds which, in addition, have 50 to 80 mole percent of monophenylsiloxy units. The siloxanes of the general formula

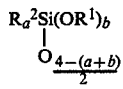

can be described, for example, by the following average structural formulas:

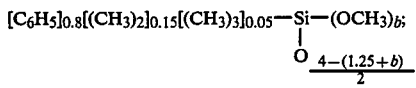

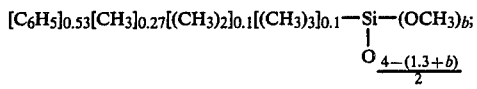

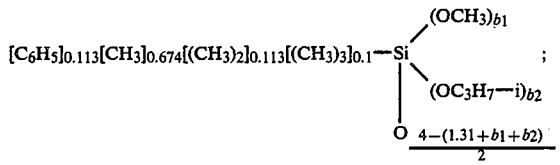

in which $b_1 + b_2 = b$ is

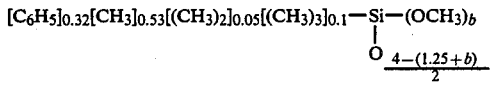

As the low molecular weight, multifunctional alcohol, ethylene glycol, trimethylolethane, trimethylolpropane, neopentyl glycol, glycerin, pentaerythritol and dimethylcyclohexane, as well as mixtures of these alcohols, may be used. The inventive process is however not limited to the above-mentioned alcohols. Particularly preferred are ethylene glycol, trimethylolethane and trimethylolpropane.

The low molecular weight, multifunctional alcohols are reacted with siloxanes of the general formula

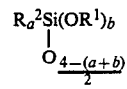

in amounts such that there is approximately one COH group for each $SiOR^1$ group.

Depending on the molecular weight and the functionality of the low molecular weight multifunctional alcohol used, the value of the index b is selected in such a way that not more than 20 weight percent of the low molecular weight multifunctional alcohol components are contained in bound form in the cured final product.

The reaction is carried out at elevated temperatures. Temperatures of 100° to 160° C. have proven to be particularly suitable for carrying out the reaction. The reaction may be accelerated by well-known transesterification catalysts. Such catalysts are, for example, titanium esters, such as, butyl titanate, as well as cobalt salts of organic acids, such as, cobalt octoate. Furthermore, sulfonic acids, such as, p-toluenesulfonic acid or benzenesulfonic acid are suitable. The addition of a catalyst is however not absolutely necessary.

The reaction may be carried out in the presence of solvents, such as, for example, aromatic solvents, e.g., xylene or toluene, or esters, such as ethylene glycol acetate or ketones, such as, cyclohexanone, and mixtures thereof. These solvents may remain in the product or may be distilled off to a desired residual content.

It is an essential feature of the process of the present invention that the reaction is terminated by cooling when the degree of conversion has reached 25% to 80% and preferably, 40% to 60%. This degree of conversion may be determined by estimating the amount of alcohol ($R^1OH$) released.

A silicone-resin pre-product results which, in use, may be cured to a film, e.g., on a metallic substrate.

The silicone resin pre-product, as well as the cured silicone resin, fulfills the initially mentioned requirements. The silicone resin pre-product can be stored practically indefinitely without any change in the viscosity of the product or its solution. The pre-product or its solution has excellent pigment compatibility, as well as a relatively high rate of curing.

A particular advantage of the silicone resin pre-product is that, on exposure to air at room temperature, it dries to a solid, non-tacky film, even if it has a high content of phenyl residues linked to silicon atoms. Surprisingly, the uncured, partially converted product already shows a high resistance to hydrolysis. This was not to be expected, especially in view of the disclosure in W. Noll "Chemie und Technologie der Silicone (Chemistry and Technology of the Silicones)", 1968, page 320. It is expressly stated therein that all cocondensation products with SiOC bonds have the property of being more or less sensitive to hydrolysis. At the same time, the particular hydrolysis susceptibility of siloxane-glycol copolymer is explicitly mentioned.

The cured silicone resins have excellent thermal stability and elasticity, with good adhesion to metallic substrates. The minimal loss in weight of the cured resins under thermal stresses is of importance, particularly for the use of silicone resins in the electrical industry.

In the following examples, the preparation of heat-curable silicone resins and the properties of the cured silicone resins are described in greater detail and compared with the products of the state of the art.

EXAMPLE 1

An alkoxypolysiloxane (1,000 g), which was prepared from a mixture of 80 mole percent of phenyltrichlorosilane, 15 mole percent of dichlorodimethylsilane and 5 mole percent of trimethylchlorosilane by a known hydrolysis procedure and which contains 7.4 weight percent of methoxy groups linked to silicon, 63.9 g of trimethylolpropane, 14.8 g of ethylene glycol, 0.2 g of butyl titanate. The mixture and 1,000 g of xylene were added to a distillation apparatus and heated with stirring. The reaction commences at 125° C. and the methanol formed is distilled off in admixture with xylene. The temperature increases further to 140° C. The reaction time is one hour. When the desired viscosity of the reaction mixture is reached, the reaction is terminated by cooling and by dilution with xylene to 50% solids. The reaction conversion, calculated from the amount of methanol distilled off, in 38%. The end product has a viscosity of 60 cSt at 25° C.

A 2 g sample of this product is baked in a dish for 2 hours at 200° C. After an aging period of 1000 hours at 200° C., a weight loss of 5.9 weight percent was noted.

EXAMPLE 2

An alkoxypolysiloxane (1,000 g) which was prepared by hydrolysis from 80 mole percent of phenyltrichlorosilane, 15 mole percent of dichlorodimethylsilane and 5 mole percent of trimethylchlorosilane and which contained 14 weight percent of methoxy groups linked to silicon, 201 g of trimethylolpropane and 0.5 g of cobalt octoate were reacted in 1,000 g of xylene as described in Example 1. A reaction conversion of 55% is attained. The end product, adjusted to 50% solids with xylene, has a viscosity of 320 cSt at 25° C.

EXAMPLE 3

As described in Example 1, 1,000 g of an alkoxypolysiloxane which was prepared from 53 mole percent of phenyltrichlorosilane, 27 mole percent of methyltrichlorosilane, 10 mole percent of dichlorodimethylsilane and 10 mole percent of trimethylchlorosilane containing 10.5 weight percent of methoxy groups linked to silicon, were reacted with 123.7 g of trimethylolpropane, 17.9 g of ethylene glycol and 0.4 g of butyl titanate. The reaction conversion was 76%. The 50% end product has a viscosity of 80 cSt at 25° C. The silicone resin has a very good pigment compatibility and is particularly suitable for the preparation of heat-stable and elastic coatings.

EXAMPLE 4

According to the method described in Example 1, 1000 g of an alkoxypolysiloxane, which was prepared from 32 mole percent of phenyltrichlorosilane, 53 mole percent of methyltrichlorosilane, 5 mole percent of dichlorodimethylsilane and 10 mole percent of trimethylchlorosilane containing 9.7 weight percent of methoxy groups linked to silicon, are reacted with 111.8 g of trimethylolpropane in 1000 g of xylene. The reaction conversion is 27%. The product dries well in air and is suitable for the manufacture of air-drying, heat-stable paint coatings.

EXAMPLE 5

According to the method described in Example 1, 1000 g of an alkoxypolysiloxane, which had been prepared from 11.3 mole percent of phenyltrichlorosilane, 67.4 mole percent of methyltrichlorosilane, 11.3 mole percent of dichlorodimethylsilane and 10 mole percent of trimethylchlorosilane and which contained 3.4 weight percent of methoxy groups as well as 2.9 weight percent of isopropxy groups, are reacted with 53 g of trimethylolpropane, 12 g of ethylene glycol and 0.18 g of butyl titanate in 1000 g of xylene. The reaction conversion based on the methoxy groups is 62%, and the conversion based on the isopropoxy groups is 12%. The product dries in air and is suitable for the manufacture of heat-stable, anticorrosion coatings.

What is claimed is:

1. Process for the preparation of heat-curable silicone resins by the reaction of alkoxysiloxanes with polyfunctional, organic hydroxyl compounds, consisting essentially of reacting:

siloxanes having the formula

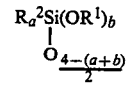

in which
OR$^1$ is an alkoxy group of primary or secondary aliphatic alcohols with 1 to 4 carbon atoms,
R$^2$ is an alkyl or phenyl group,
a has a value of 1.0 to 1.5, and
b has a value of 0.1 to 0.7,
with low molecular weight, multifunctional alcohols selected from the group consisting of ethylene glycol, trimethylolethane, trimethylolpropane, neopentyl glycol, glycerin, pentaerythritol and dimethylolcyclohexane and mixtures thereof, at temperatures of 100° C. to 160° C.,
and removing the alcohol R$^1$OH in such a ratio of quantities that one SiOR$^1$ group corresponds approximately to one COH group and terminating the reaction at a 25% to 80% degree of conversion by cooling to a temperature of less than 100° C. such that the amount of siloxane in the finished resin is equal to or more than 80 weight percent.

2. The process according to claim 1 wherein a has a value of 1.2 to 1.4 and b has a value of 0.3 to 0.6.

3. The process of claims 1 or 2 wherein OR$^1$ represents a methoxy group.

4. The process of claims 1 or 2 wherein OR$^1$ is both methoxy and a higher alkoxy group selected from the group consisting of n-propoxy, isopropoxy, n-butoxy, and isobutoxy, the molar ratio of methoxy to higher alkoxy group being from 2.5 to 1:1.

5. The process of claims 1 or 2 wherein R$^2$ is a methyl or phenyl group.

6. The process of claims 1 or 2 wherein R$^2$ consists of methyl and phenyl groups in a molar ratio of 0.5 to 1.5:1.

7. The process of claims 1 or 2 wherein the siloxane contains 10 to 30 mole percent of dimethylsiloxy units and 50 to 10 mole percent of trimethylsiloxy units.

8. The process of claims 1 or 2 wherein the siloxane contains 50 to 80 mole percent of monophenylsiloxy units.

9. The process of of claims 1 or 2 wherein the reaction is carried out in the presence of transesterification catalysts.

10. The process of claims 1 or 2 wherein the reaction is carried out in the presence of a transesterification catalyst selected from the group consisting of titanium esters and cobalt salts of organic acids.

11. The process of claims 1 or 2 wherein the reaction is carried out in the presence of a transesterification catalyst selected from the group consisting of p-toluenesulfonic acid and benzenesulfonic acid.

12. The process of claims 1 or 2 wherein the reaction is carried out in the presence of a solvent.

13. A heat-curable silicone resin produced by the process of claim 1.

14. Process for the preparation of a cured silicone resin by the reaction of alkoxysiloxanes with polyfunctional, organic hydroxyl compounds, consisting essentially of reacting:
siloxanes having the formula

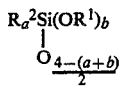

in which
OR$^1$ is an alkoxy group of primary or secondary aliphatic alcohols with 1 to 4 carbon atoms,
R$^2$ is an alkyl or phenyl group,
a has a value of 1.0 to 1.5, and
b has a value of 0.1 to 0.7,
with low molecular weight, multifunctional alcohols selected from the group consisting of ethylene glycol, trimethylolethane, trimethylolpropane, neopentyl glycol, glycerin, pentaerythritol and dimethylolcyclohexane and mixtures thereof, at temperatures of 100° C. to 160° C.,
and removing the alcohol R$^1$OH in such a ratio of quantities that one SiOR$^1$ group corresponds approximately to one COH group and terminating the reaction at a 25% to 80% degree of conversion by cooling to a temperature of less than 100° C. such that the amount of siloxane in the finished resin is equal to or more than 80 weight percent, and then curing the resin by heating.

15. The process of claim 14 wherein a has a value of 1.2 to 1.4 and b has a value of 0.3 to 0.6.

16. The process of claim 14 wherein OR$^1$ represents a methoxy group.

17. The process of claim 14 wherein OR$^1$ is both methoxy and a higher alkoxy group selected from the group consisting of n-propoxy, isopropoxy, n-butoxy, and isobutoxy, the molar ratio of methoxy to higher alkoxy group being from 2.5 to 1:1.

18. The process of claim 14 wherein R$^2$ is a methyl or phenyl group.

19. The process of claim 14 wherein R$^2$ consists of methyl and phenyl groups in a molar ratio of 0.5 to 1.5:1.

20. The process of claim 14 wherein the siloxane contains 10 to 30 mole percent of dimethylsiloxy units and 50 to 10 mole percent of trimethylsiloxy units.

21. The process of claim 14 wherein the siloxane contains 50 to 80 mole percent of monophenylsiloxy units.

22. The process of claim 14 wherein the reaction is carried out in the presence of transesterification catalysts.

23. The process of claim 14 wherein the reaction is carried out in the presence of a transesterification catalyst selected from the group consisting of titanium esters and cobalt salts of organic acids.

24. The process of claim 14 wherein the reaction is carried out in the presence of a transesterification catalyst selected from the group consisting of p-toluenesulfonic acid and benzenesulfonic acid.

25. The process of claim 14 wherein the reaction is carried out in the presence of a solvent.

26. The cured silicone resin produced by the process of claim 14.

* * * * *